UNITED STATES PATENT OFFICE.

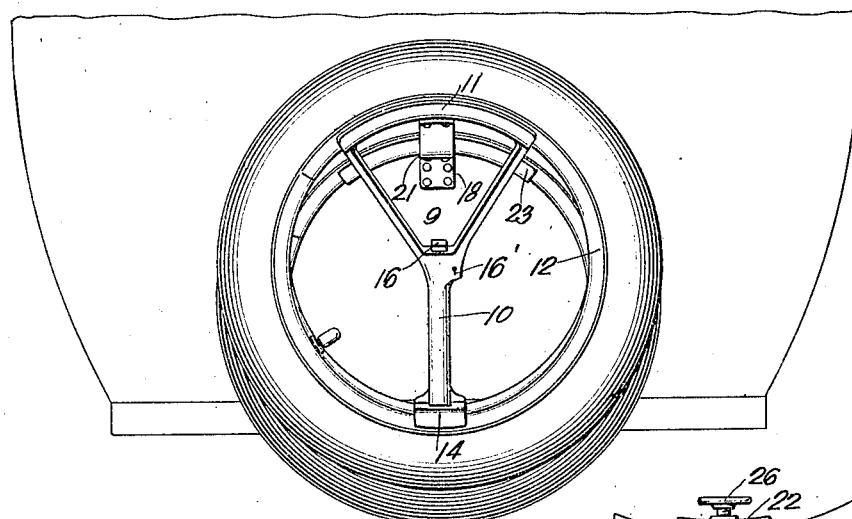
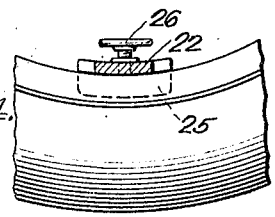
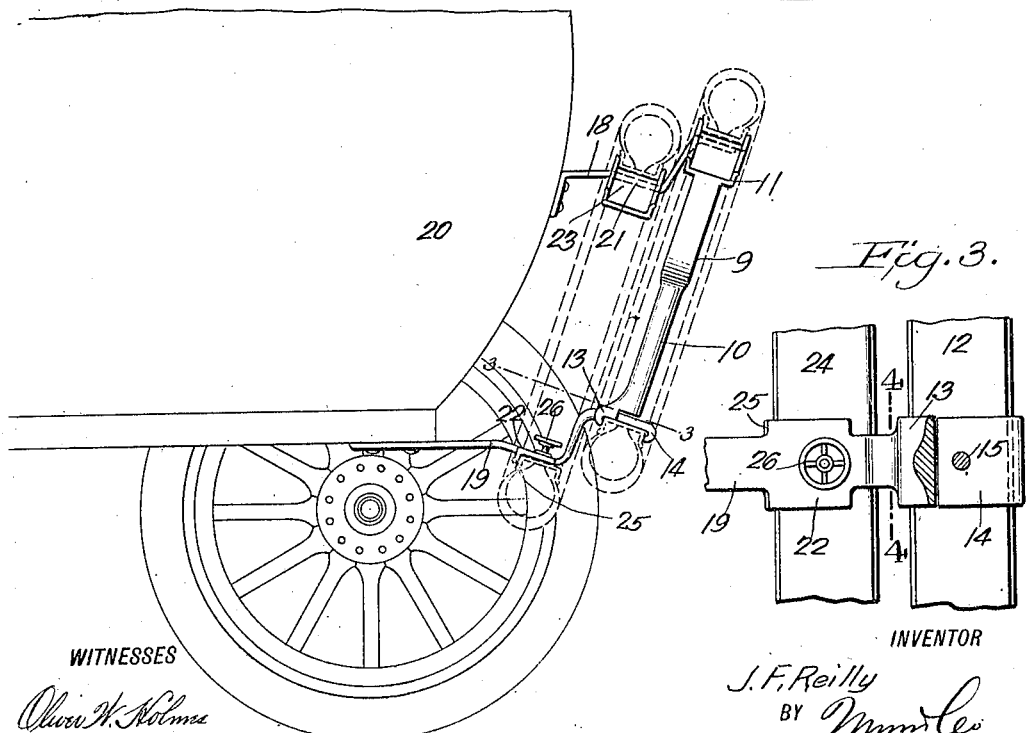

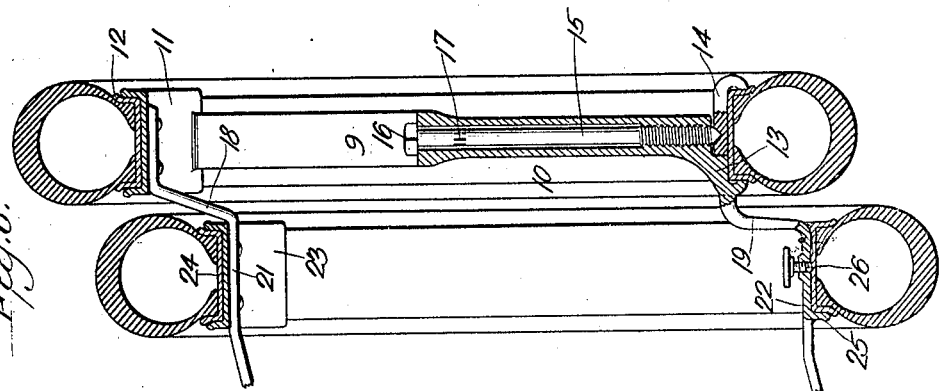
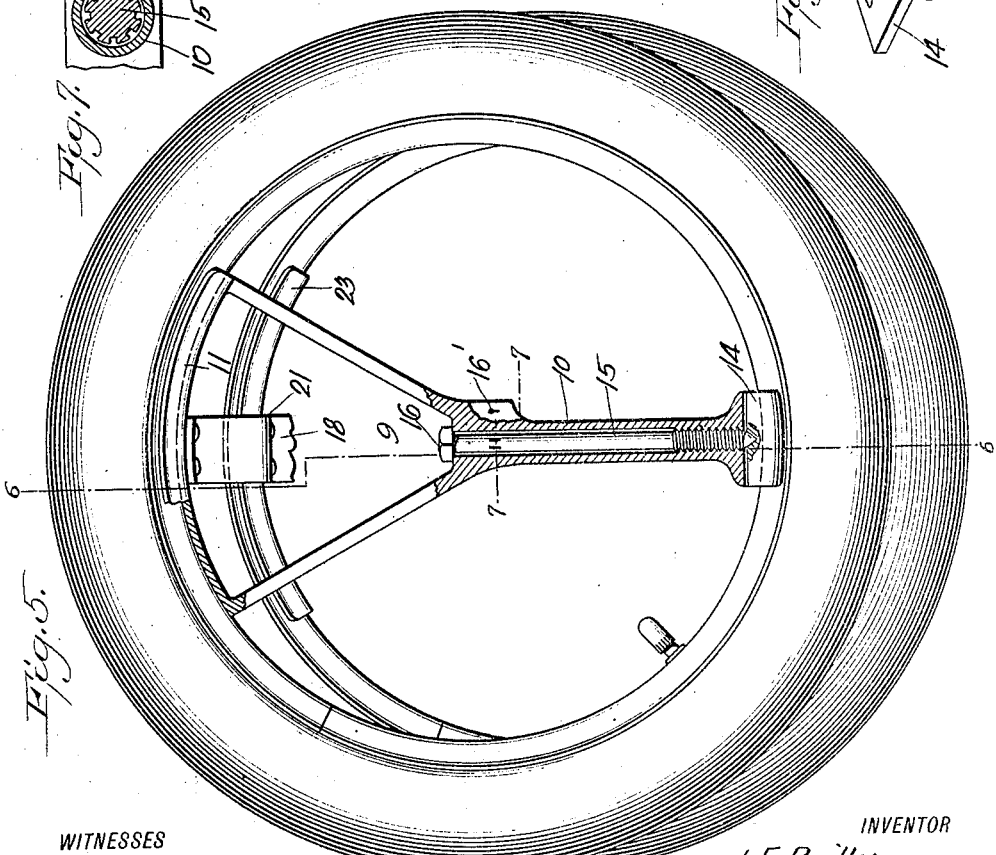

JOHN FLORENCE REILLY, OF NEW YORK, N. Y.

TIRE-CARRIER.

1,292,054.

Specification of Letters Patent. Patented Jan. 21, 1919.

Application filed April 5, 1918. Serial No. 226,869.

*To all whom it may concern:*

Be it known that I, JOHN F. REILLY, a citizen of the United States, and a resident of the city of New York, Far Rockaway, borough of Queens, in the county of Queens and State of New York, have invented a new and Improved Tire-Carrier, of which the following is a full, clear, and exact description.

My invention relates to the type of tire carriers which are provided on automobiles for spare tires. An object of the invention is to provide a simple and inexpensive tire carrier which has means for locking spare tires thereon so as to prevent an unauthorized person from tampering with the tires on the carrier.

Another object of the invention is to provide a carrier of the class described which can be easily and quickly secured to a motor vehicle and which is particularly adaptable for the rear end of the vehicle.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of my carrier with tires thereon as it will appear on the rear of the vehicle;

Fig. 2 is a fragmentary side elevation of a vehicle provided with my carrier;

Fig. 3 is a section on line 3—3, Fig. 2;

Fig. 4 is a section on line 4—4, Fig. 3;

Fig. 5 is an enlarged elevation of the carrier, certain parts of which are shown in section to illustrate the details of construction;

Fig. 6 is a vertical section on line 6—6, Fig. 5;

Fig. 7 is a cross section on line 7—7, Fig. 5; and

Fig. 8 is a perspective view of the removable jaw of the carrier.

Referring to the drawings, the main body 9 of the carrier is Y shape. The stem 10 of the Y is tubular and the branches are spanned or bridged by an arcuate member 11 which is channel shape and the radius of curvature of which is that of the rim 12 which is to fit thereon. The stem 10 terminates with a rearwardly-directed shoulder 13 which forms a portion of a seat for the rim 12. The other portion, which complements the seat, is a removable jaw 14 which is locked to the stem 10 by means of a bolt 15 threaded in the hollow stem 10 and which bolt is provided with a head 16 lying between the branches whereby the bolt may be manipulated.

The stem 10 also carries a key-operable mechanism 16' located near the junction of the stem with the branches. For this key mechanism the bolt 15 is provided with recesses 17 which come in register with said key-operating mechanism and may be engaged therewith and, therefore, the rotation of the bolt within the tubular stem 10 prevented and, in consequence, the disengagement of the jaw 14 from the stem 10. By this means a rim may be locked on the carrier 9.

The carrier 9 has rearwardly extending brackets 18 and 19 by means of which the carrier is secured to a vehicle 20. The brackets 18 and 19 have depressed portions 21 and 22 respectively. The depressed portion 21 in proximity of the carrier 9 supports an arcuated section 23 which is of channeled cross section to accommodate a rim 24 and which is rigidly secured to the bracket and has a curvature corresponding to the radius of the rim it is to carry. The depression 22 has a downwardly extending lip 25 which forms a stop for the rim which encompasses the section 23 and the depression 22 of the bracket 19. To lock the rim a threaded member 26 is provided in the depression 22 of the bracket 19.

It will be seen that the rim carried in the rear of the carrier 9 cannot be removed unless the rim with the tire on the carrier is first removed; and to remove the rim 12 which is on the carrier 9, it is necessary first to operate the key mechanism 16' to permit the rotation of the bolt 15, then when the bolt is unscrewed the jaw 14 can be withdrawn and, therefore, the rim with the tire thereon swung off the Y-shaped carrier. By unscrewing the member 26 the rim 24 with its tire can be removed by swinging it off the rear of the carrier formed by the depressed bracket section 22 and arcuated section 23. The Y-shaped body 9 is easily passed through the rim 24 removed from the rear of the carrier 9.

I claim:

1. In a device of the class described, a Y-shaped member having a tubular stem, an arcuate member bridging the branches of the Y and adapted to form a seat for the rim of a tire, said stem having a rearward shoulder which also forms a seat for the rim, a jaw coöperating with the shoulder, a bolt threaded in the stem of the Y-shaped member for engaging the jaw and locking the same to the stem, and key-operating means in said stem for engaging said bolt and preventing the rotation of same in the tubular stem.

2. In a device of the class described, a Y-shaped member having a tubular stem, an arcuate member bridging the extremities of the branches of the Y-shaped member and forming a seat for a rim of a tire, a removable jaw associated with the end of the stem for locking the rim at the stem, a bolt threaded into the tubular stem of the Y-shaped member having means for engaging the jaw and locking the same to the stem, key-operating means at the stem, said bolt having means adapted to be engaged by the key-operating means whereby the turning of the bolt in the stem may be prevented, and brackets extending from the arcuate member to the stem for securing said Y-shaped member.

3. In a device of the class described, a pair of arcuate members, a securing bracket supporting said arcuate members in spaced relation and at different levels, a second securing bracket having portions at different levels adapted to co-act with the arcuate members, means uniting said brackets and retaining the arcuate members in operative relation with the second securing bracket, a detachable member coöperating with said second bracket, and locking means for said detachable member in said means connecting the brackets.

4. In a device of the class described, a Y-shaped member having a tubular stem, an arcuate member bridging the extremities of the branches of the Y and forming a seat for the rim of a tire, detachable means at the foot of the stem, a bolt threaded in the stem for engaging the detachable means whereby the detachable means is locked to the stem, key-operating means in the stem for locking the bolt, brackets extending rearwardly from the arcuate member and the stem, a second arcuate member on the bracket extending from the first-mentioned arcuate member, said second-mentioned arcuate member also forming a seat for the rim, a lip on the bracket of the stem forming an abutment for a rim encompassing the second-mentioned arcuate member and the bracket extending from the stem, and means on said bracket extending from the stem for locking a rim when the same encompasses the second-mentioned arcuate member and the bracket of the stem.

JOHN FLORENCE REILLY.